US006959074B2

(12) United States Patent
Berstis

(10) Patent No.: US 6,959,074 B2
(45) Date of Patent: Oct. 25, 2005

(54) APPARATUS AND METHOD FOR TRANSMISSION AND RECEIPT OF CONFERENCE CALL ROSTER INFORMATION VIA THE INTERNET

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 10/001,750

(22) Filed: Oct. 31, 2001

(65) Prior Publication Data

US 2003/0081750 A1 May 1, 2003

(51) Int. Cl.[7] ............................................... H04M 3/42
(52) U.S. Cl. ............................ 379/202.01; 379/93.21
(58) Field of Search ......................... 379/88.01, 88.02, 379/88.13, 88.21, 93.21, 93.23, 158, 202.01, 203.01, 206.01

(56) References Cited

U.S. PATENT DOCUMENTS

| | | | |
|---|---|---|---|
| 4,827,519 A | * 5/1989 | Fujimoto et al. | 704/250 |
| 5,465,290 A | 11/1995 | Hampton et al. | 379/67 |
| 5,668,863 A | * 9/1997 | Bieselin et al. | 379/202.01 |
| 5,710,591 A | * 1/1998 | Bruno et al. | 348/14.09 |
| 5,896,422 A | * 4/1999 | Lu | 375/317 |
| 6,020,916 A | 2/2000 | Gerszberg et al. | 348/15 |
| 6,236,854 B1 | 5/2001 | Bradshaw, Jr. | 455/416 |
| 6,246,751 B1 | 6/2001 | Bergl et al. | 379/67.1 |
| 6,591,242 B1 | * 7/2003 | Karp et al. | 705/2 |

* cited by examiner

Primary Examiner—Bing Q. Bui
(74) Attorney, Agent, or Firm—David A. Mims, Jr.; Rudolf O. Siegesmund

(57) ABSTRACT

An apparatus and method is disclosed that allows a participant in a conference call to receive conference call roster information at a telephone display unit, at a computer display or at both types of display. The conference call information is updated during the call and includes identification of the speaker during a conference call. The conference callers are connected together and identified either by standard caller identification or by other identification provided by the operator. The conference callers' identifications are then transmitted in two ways. First, a coded signal is sent over the telephone connection to a telephone display unit. Second, an information packet is transmitted over the Internet to a conference call participant's computer. A server computer monitors the conference call and the identification of parties involved is updated and parties are added or disconnected. The speaking party is identified in one of two ways. First, during the call, the speaker's telephone line will have a higher transmission amplitude than the other telephone lines and the line with the highest transmission amplitude will be identified by the server computer. Second, voice identification data is gathered before the conference call and stored in the server computer for use in identifying the speaker.

23 Claims, 15 Drawing Sheets

FIG. 6F
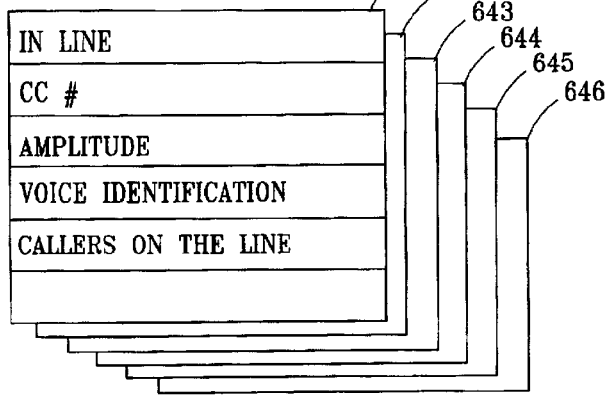
FIG. 6G
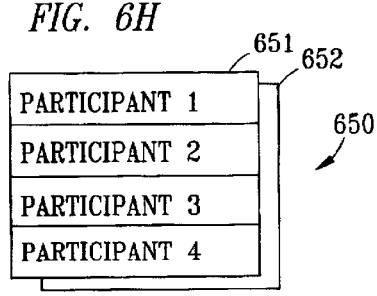
FIG. 6H
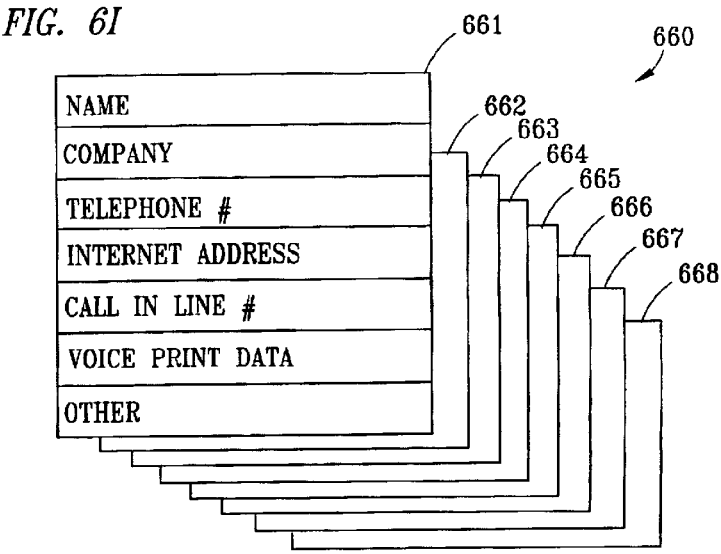
FIG. 6I

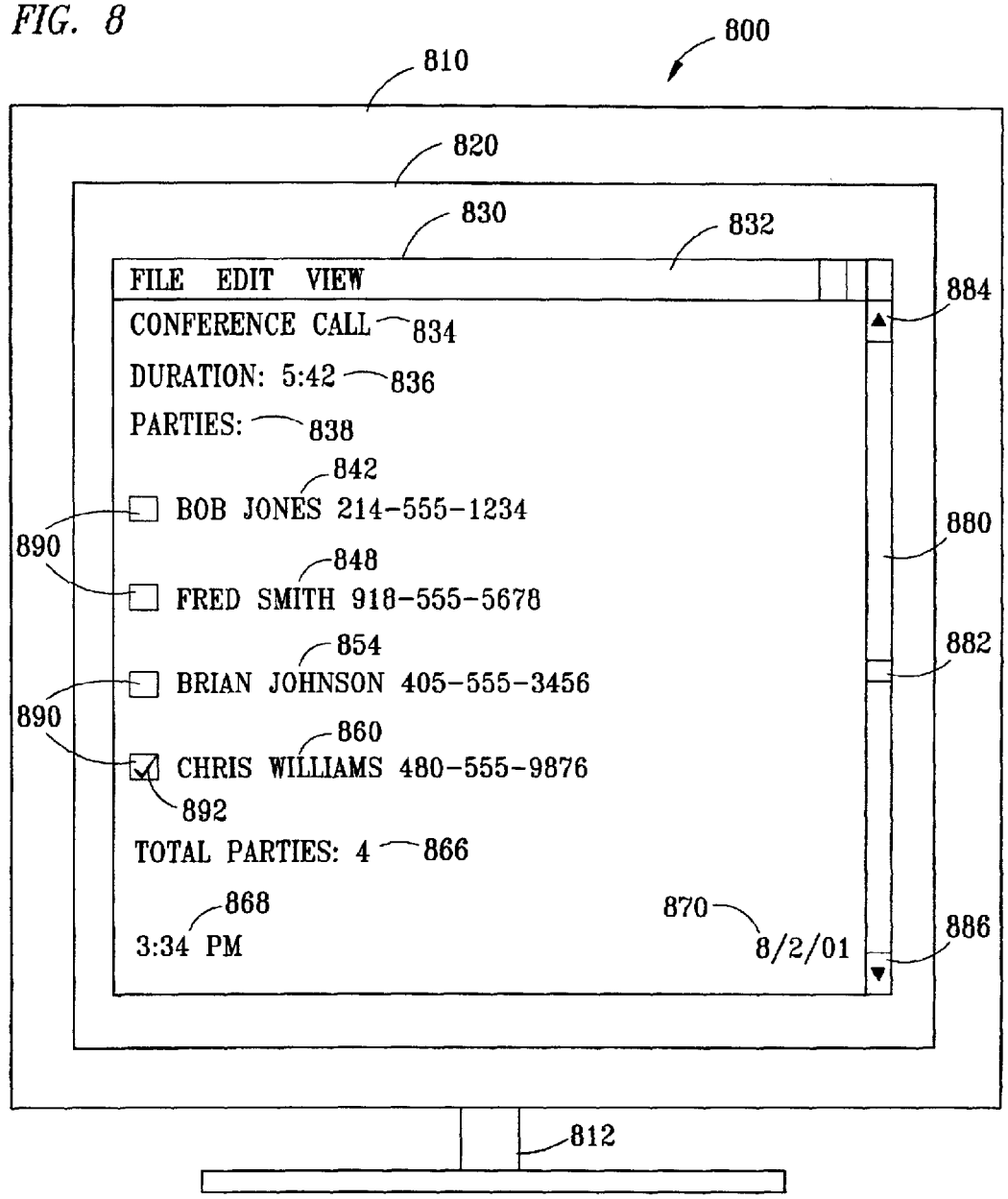

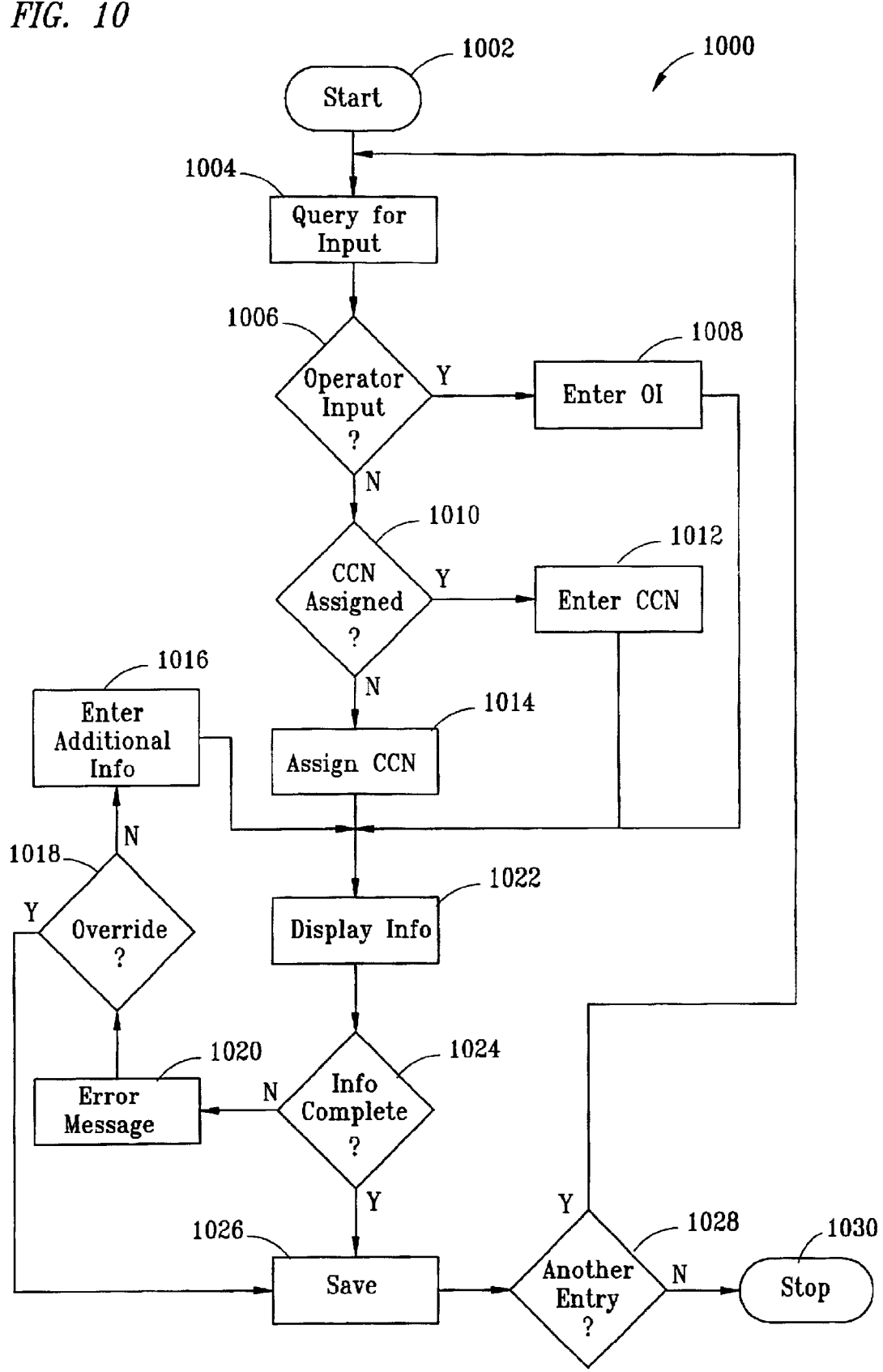

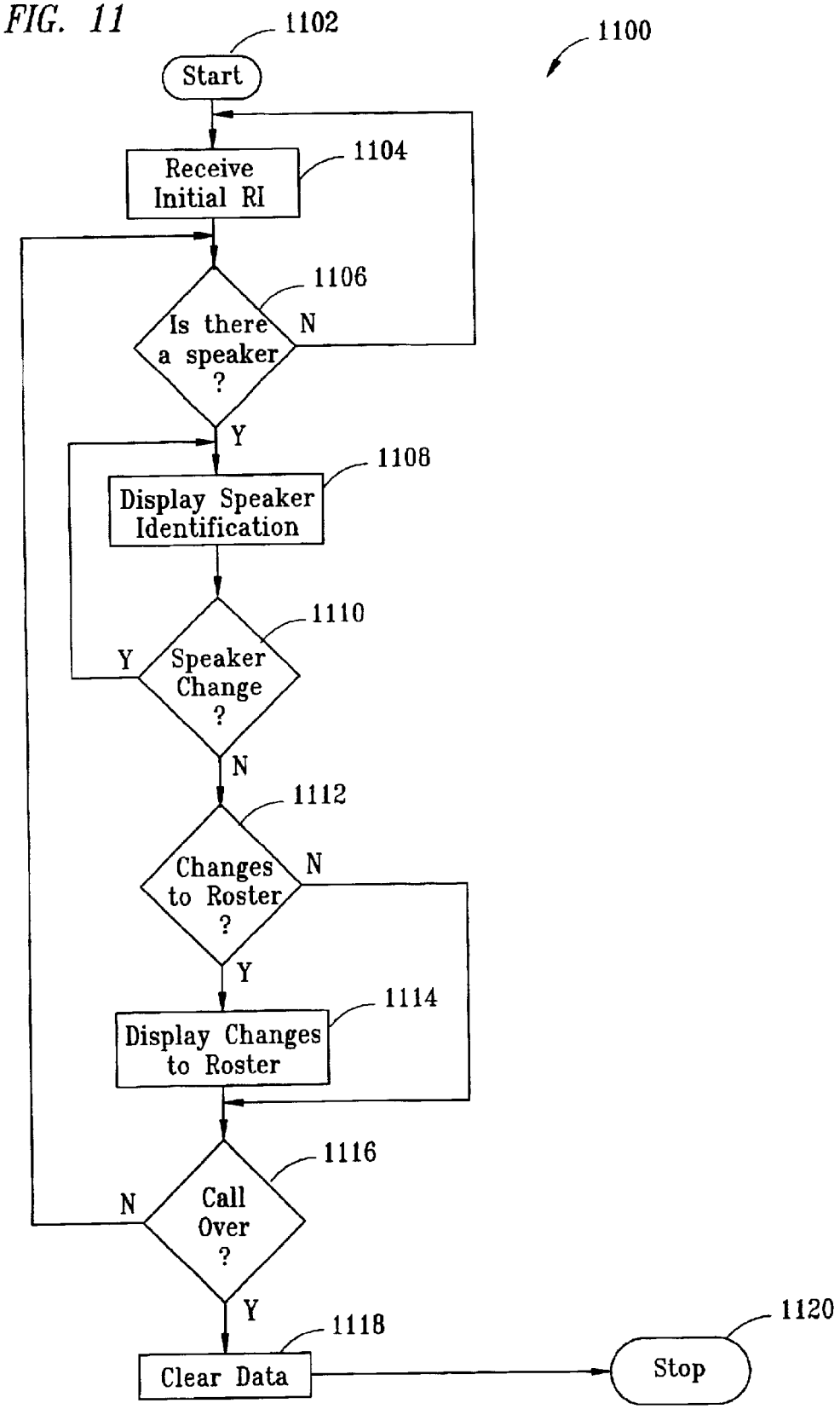

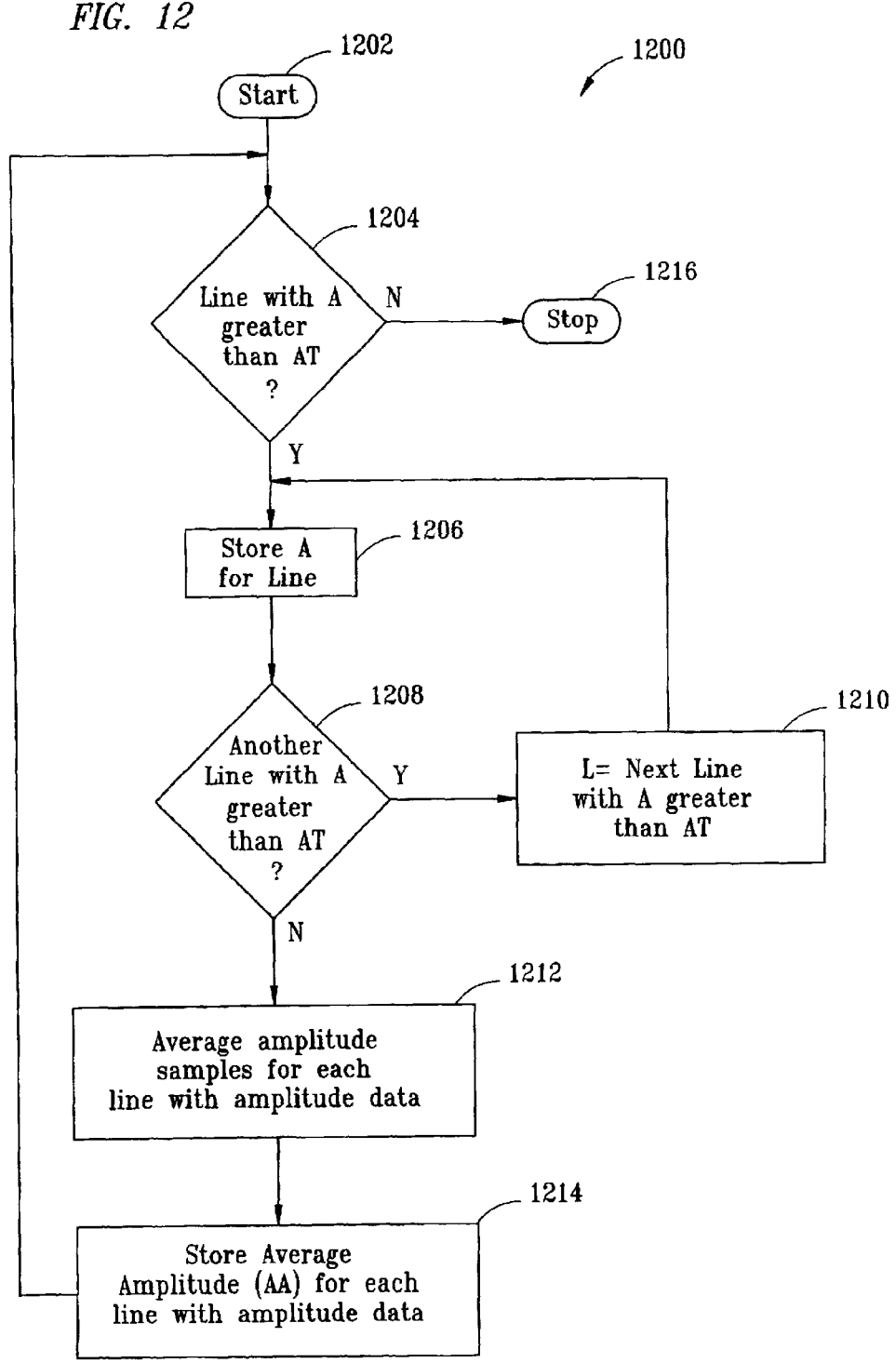

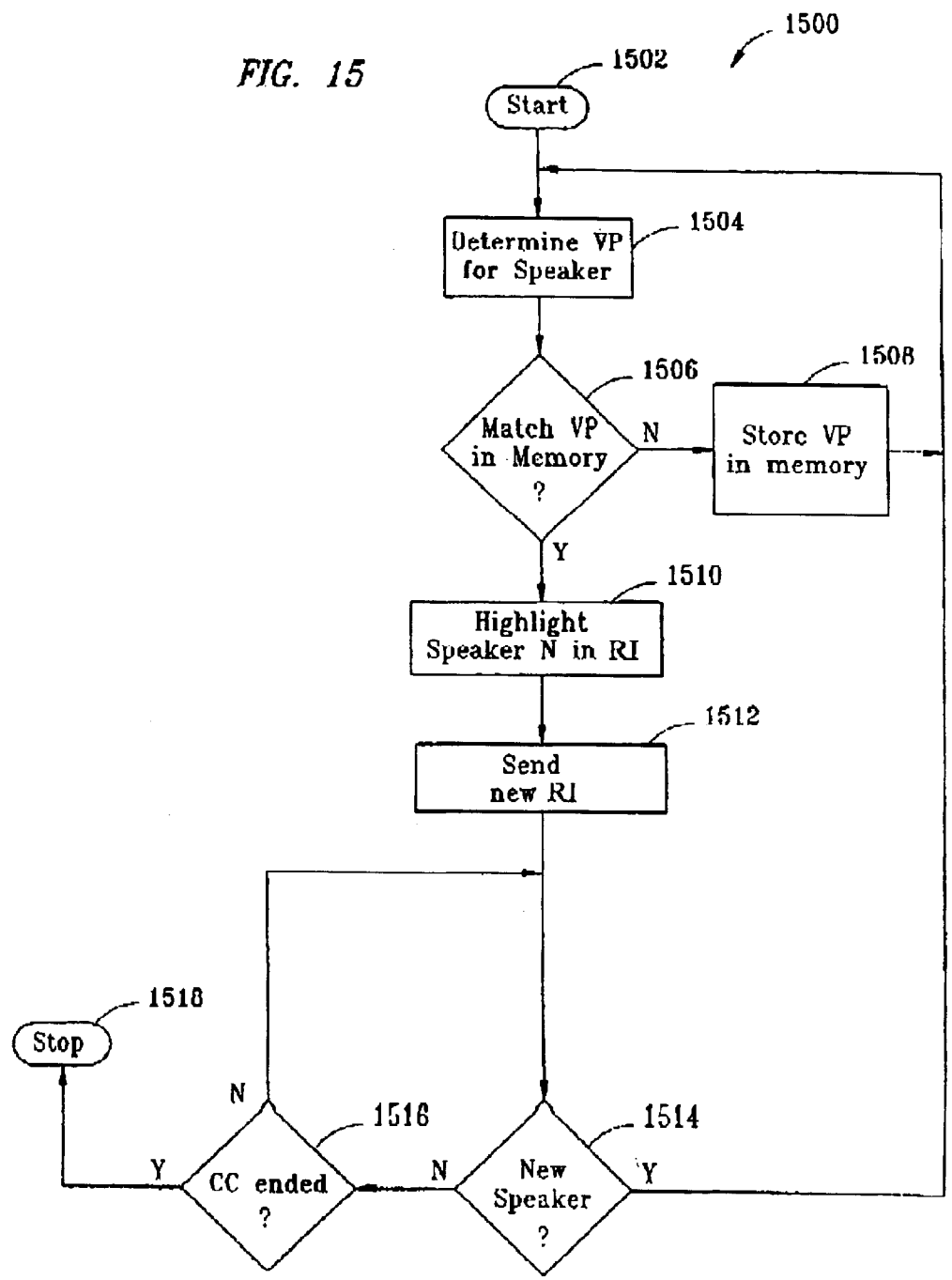

APPARATUS AND METHOD FOR TRANSMISSION AND RECEIPT OF CONFERENCE CALL ROSTER INFORMATION VIA THE INTERNET

FIELD OF INVENTION

The present invention generally relates to identification of parties in a telephone conversation and specifically to an apparatus and method for identifying and indicating the speaker during a multiple party telephone conversation.

CROSS REFERENCE TO RELATED APPLICATIONS

This application is related to the following concurrently filed applications: "Apparatus and Method for Transmission and Receipt of Conference Call Roster Information via a Telephone Display Unit" and "Apparatus and Method for Providing Conference Call Roster Information with Speaker Voice Identification."

BACKGROUND OF THE INVENTION

Caller Identification (Caller ID) enables telephone conference caller participants to identify a caller before picking up the telephone. Caller ID is useful when the caller does not identify himself and immediately begins a conversation. Caller ID has solved the problem of awkwardly interrupting a telephone conversation in order to identify the other party involved. However, Caller ID cannot identify the speaking party where there are multiple party telephone conversations, such as during a conference call.

Due to increased travel costs and the cost of office space, conference call meetings have increased in popularity. Frequently, the participants call into a conference calling service which links the appropriate callers together. To attend a conference call, the parties call a specific telephone number and identify themselves with a conference call number specific to each party. All of the parties are then linked together on a common line and the conference call proceeds. During the conference call, it is often difficult to identify the speaker at any given time. Interrupting the conference call to identify the speaker is not preferable as it disrupts the flow of the conference call. Therefore, a need exists for an apparatus and a method for identifying and indicating the speaker during a conference call.

SUMMARY OF INVENTION

The present invention allows a participant in a conference call to receive conference call information at a telephone display unit, at a computer display or at both types of display. The conference call information is updated during the call and includes identification of the speaker during a conference call. The conference callers are connected together and identified either by standard caller identification or by other identification provided by the operator. The conference callers' identifications are then transmitted in two ways. First, a coded signal is sent over the telephone connection to a telephone display unit. Second, an information packet is transmitted over the Internet to a conference call participant's computer. A server computer monitors the conference call and the identification of parties involved is updated and parties are added or disconnected. The speaking party is identified in one of two ways. First, during the call, the speaker's telephone line will have a higher transmission amplitude than the other telephone lines and the line with the highest transmission amplitude will be identified by the server computer. Second, voice identification data is gathered before the conference call and stored in the server computer for use in identifying the speaker.

BRIEF DESCRIPTION OF DRAWINGS

FIG. 6F is a depiction of an incoming line list file;

FIG. 6G is a depiction of a plurality of line information files;

FIG. 6H is a depiction of a participant list file;

FIG. 6I is a depiction of a plurality of participant information files;

FIG. 8 is a depiction of the computer display;

FIG. 10 is a flow chart of the information packet program;

FIG. 11 is a flow chart of the telephone display unit program;

FIG. 12 is a flow chart of the voice amplitude acquisition program;

FIG. 15 is a flow chart of the voice print identification program.

DESCIPTION OF PREFERRED EMBODIMENTS

Figure 1:
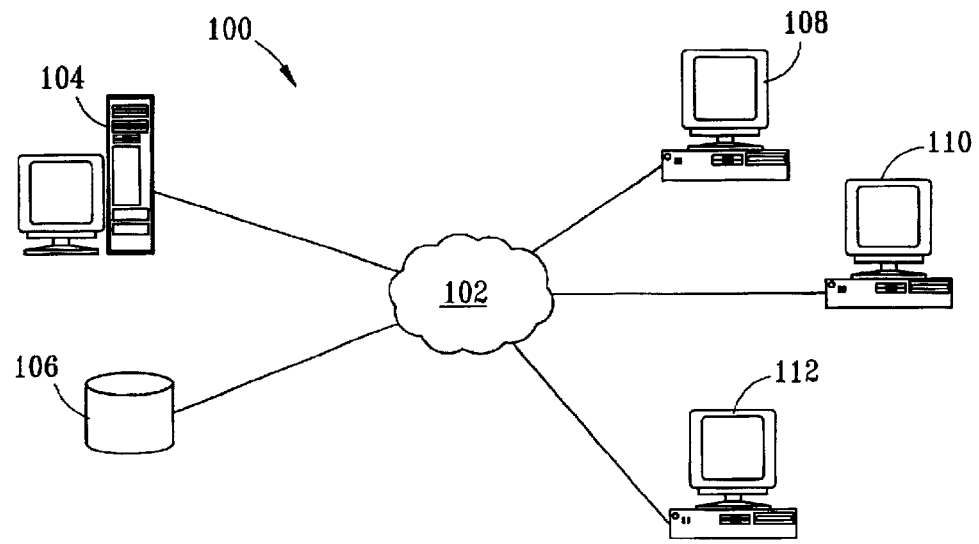
FIG. 1 is depiction of a distributed data processing system.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
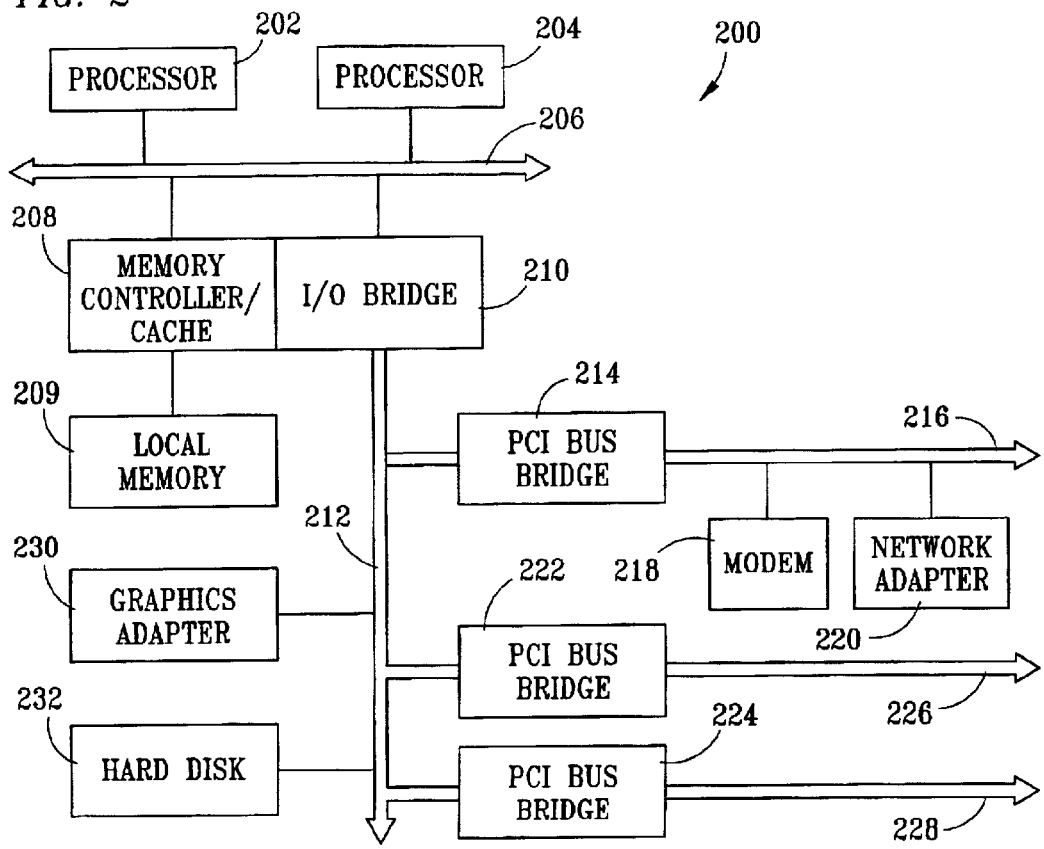
FIG. 2 is a depiction of a server computer.

Referring to FIG. 2, a block diagram depicts data processing system 200, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI bus local 216. Typical PCI bus implementations will support four PCI expansion slots or add-in connectors. Communications links to network computers 108, 110 and 112 in FIG. 1 may be provided through modem 218 and network adapter 220 connected to first PCI local bus 216 through addin boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
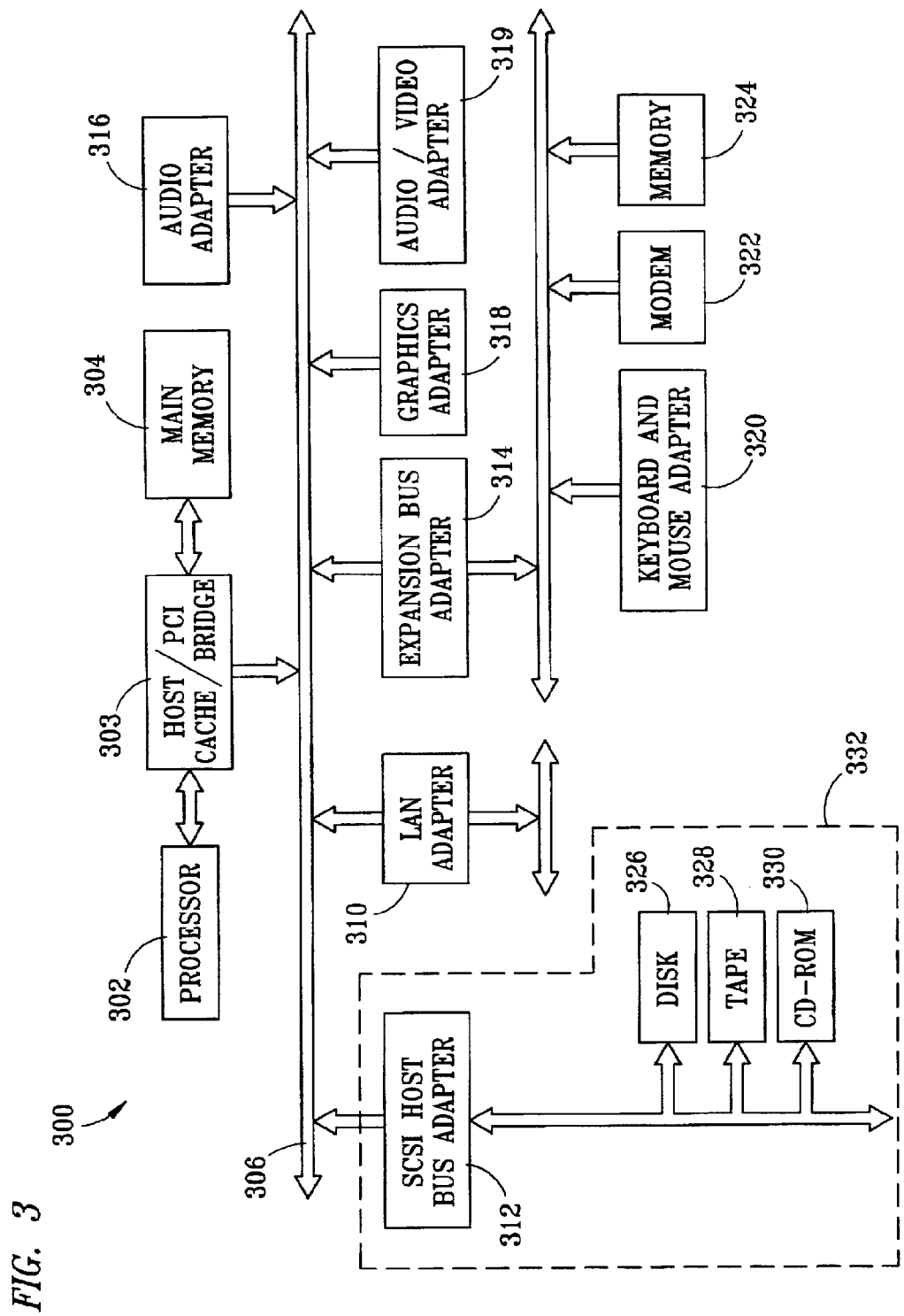
FIG. 3 is a depiction of a client computer.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video (A/V) adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adaptor 312 hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310 model 322, or the like. As another examples data processing system 300 may be configured to be bootable without relying on some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such as a floppy disc, a hard disk drive, a RAM, and CD-ROMs, and transmission-type media, such as digital and analog communications links.

Figure 4:
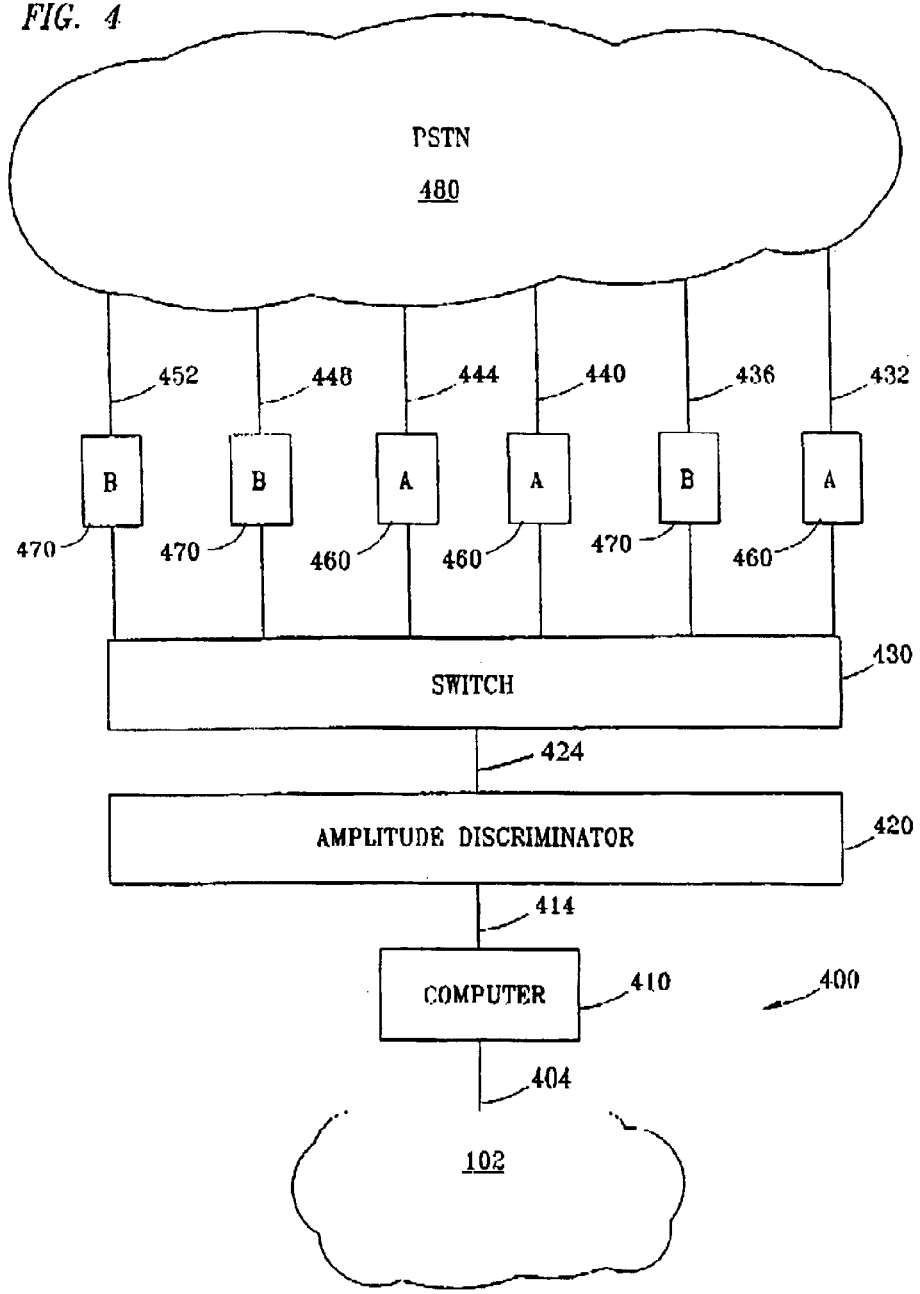
FIG. 4 is a depiction of the server computer connected to the telephone switchboard and to the Internet.

FIG. 4 is a depiction of Caller ID System 1 (CIDS1) 400. CIS1 has a computer 410 connected to amplitude discriminator 420 by line 414 and to network 102 by line 404. Computer 410 may be a server computer such as data processing system 200 in FIG. 2. In the preferred embodiment network 102 is the Internet. Amplitude discriminator 420 is connected to switch 430 by line 424. Switch 430 connects incoming telephone lines (TL) TL1 432, TL2 436, TL3 440, TL4 444, TL5 448 and TL6 452. The incoming telephone lines may be wire or wireless and extend from public switch telephone network (PSTN) 480. Switch 430 can configure the incoming lines to form any combination of conference calls for purposes of illustration only, and not by way of limitation, conference call A (CCA) 460 and conference call B (CCB) 470 are shown. CCA 460 has TL1 432, TL3 440 and TL4 444 connected. CCB has TL2 436, TL5 448 and TL6 452 connected. Amplitude discriminator 420 determines the amplitude of the signal on TL1 432, TL2 436, TL3 440, TL4 444, TL5 448 and TL6 452. Amplitude discriminator transmits the amplitude of each line connected by switch 430 to computer 410. Computer 410 then determines which line in CCA has the greatest amplitude and transmits that information over network 102 to all participants in CCA. Computer 410 also determines which line in CCB 470 has the greatest amplitude and transmits that information over network 102 to all participants in CCB 470. In addition, Roster Information (RI) can be Transmitted over the Network. As used herein the term Roster Information (RI) means a list of speaker identifications and any other information that may be desirable to furnish to a conference call participant and that can be accessed during the conference call by either a computer or a telephone display unit.

Figure 5:
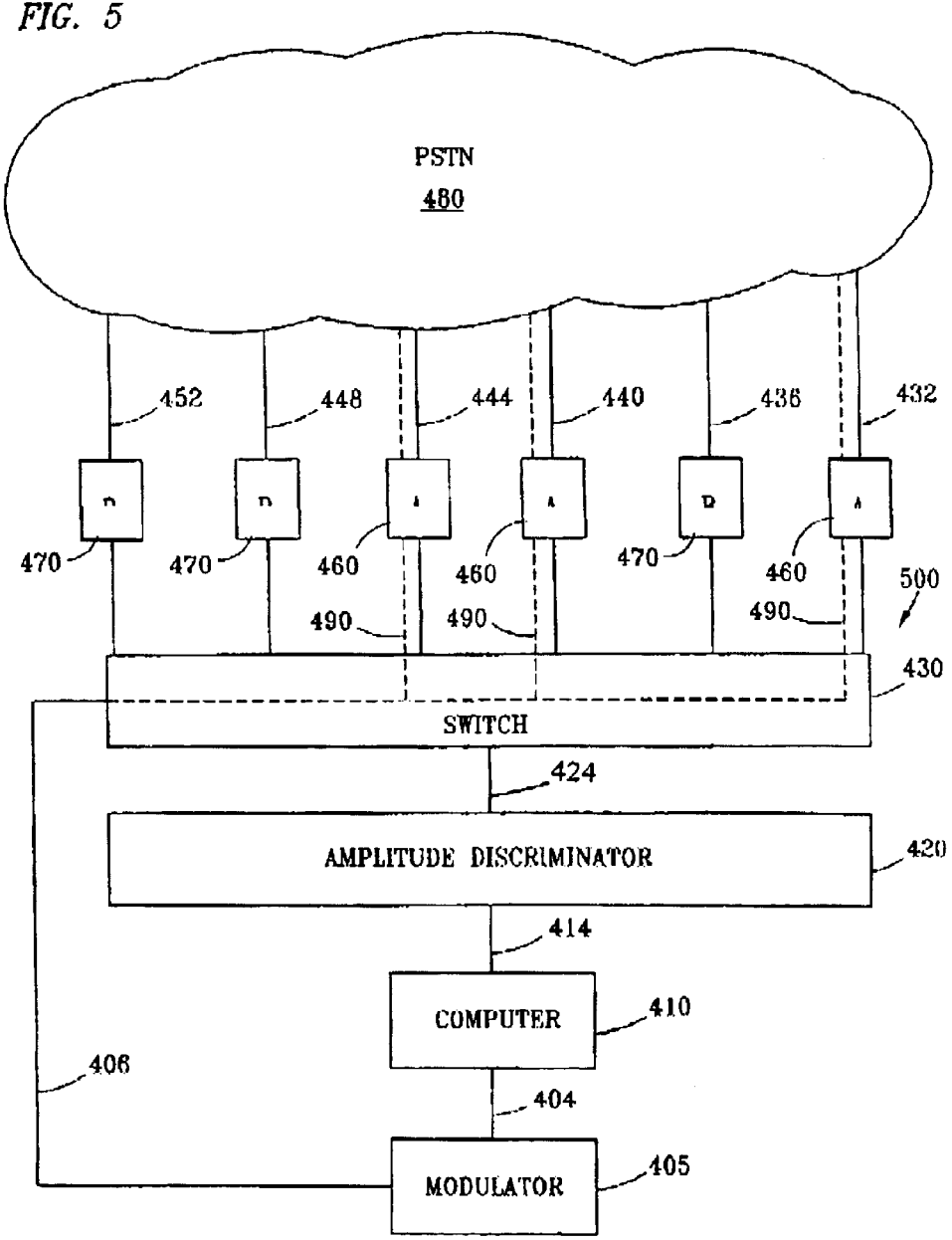
FIG. 5 is depiction of the server computer attached to a modulator for sending a coded signal through the telephone connection.

FIG. 5 depicts Caller ID System 2 (CIDS2) having server computer 410 connected to amplitude discriminator 420 by line 414 and to modulator 405 by line 404. Amplitude discriminator 420 is connected to switch 430 by line 424. For purposes of illustration only, and not by way of limitation, switch 430 connects the same incoming lines from PSTN 480 as shown in FIG. 4 into the same conference call A (CCA) 460 and conference call B (CCB) 470. As in FIG. 4, Amplitude discriminator 420 transmits the amplitude of each line connected by switch 430 to computer 410. However, in CISD2 500, computer 410 determines which line has the greatest amplitude and transmits this information to modulator 405 for encoding into coded signal (CS) 490 for transmission to all lines in CCA 460. Modulator 405 is connected to switch 430 by line 406 for transmission of CS 490. Persons skilled in the art are aware of multiple ways in which CS 490 can be transmitted digitally on a digital phone system, and also of multiple ways in which CS 490 can be encoded on an analog phone system by the use of low frequency (or other frequency, but different from those produced by human voices) tones carrying encoded identification of the speaker. For example, a system similar to that used to unlock amateur radio repeaters via low level tones would be almost inaudible on a conference call. As in FIG. 4, Roster Information (RI) can be transmitted by coded signals such as CS 490. RI can be kept to a minimum by using shorthand designations for participants such as numbers or codes and thereby minimizing the impact of low frequency tones when such a method is used for transmission.

Figure 6A:
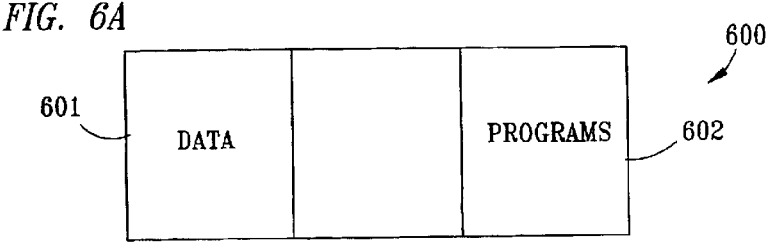
FIG. 6A is a depiction of the sever server computer memory.

FIG. 6A is a depiction of memory 600 located in computer 410 of FIG. 4 and FIG. 5. Memory 600 includes without limitation the storage locations for data storage 601 and program storage 602.

Figure 6B:
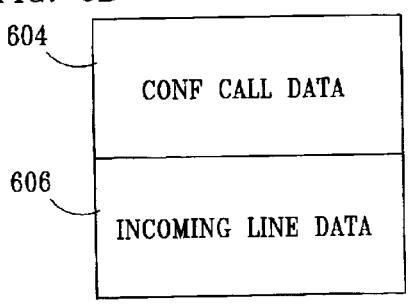
FIG. 6B is a depiction of the organization of the data files in the computer memory.

FIG. 6B is a depiction of data storage 601 including without limitation conference call data 604 and incoming line data 606.

Figure 6C:
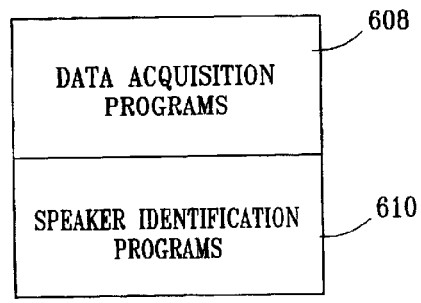
FIG. 6C is a depiction of the organization of the programs in the computer memory.

FIG. 6C is a depiction of program storage 602 including without limitation data acquisition programs 608 and speaker identification programs 610. Conference call data 604 includes without limitation a conference call list file 612 (FIG. 6D) and a plurality of conference call information files 620 (FIG. 6E).

Figure 6D:
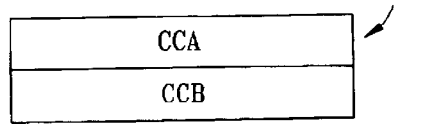
FIG. 6D is a depiction of the conference call list file.
Figure 6E:
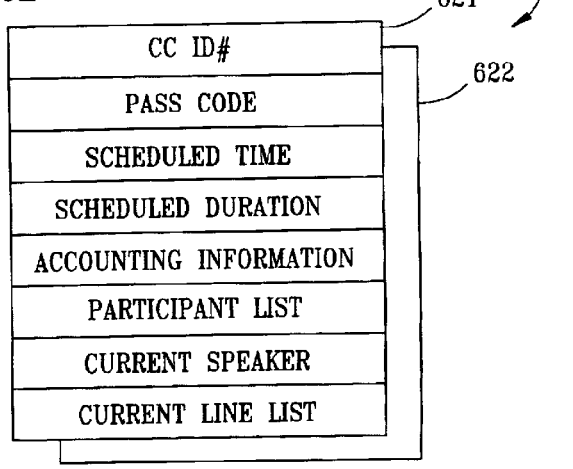
FIG. 6E is a depiction of a plurality of conference call information files.

In FIG. 6D there are two fields in conference call list file for the two conference calls designated in FIGS. 4 and 5 as conference calls A and B. Each conference call field in conference call list file 612 is linked by pointers to a conference call information file. For example, referring to FIG. 6E, conference call A has information file 621 and conference call B has information file 622. Each information file has the same fields for data. By way of example, each conference call information file is shown having 8 fields as follows: (1) a conference call identification number; (2) a pass code for gaining access to the conference call; (3) the scheduled time of the conference call; (4) the scheduled duration of the conference call; (5) accounting information regarding the conference call; (6) a listing of the participants; (7) a designation of the current speaker; and (8) a current line list.

FIG. 6F depicts an incoming line list file 630 with fields for identification of every incoming line. By way of example, incoming line list file 630 shows six incoming lines to correspond to the six incoming lines shown in FIGS. 4 and 5. However, incoming line list file 630 could consist of any number of incoming lines. Each incoming line field in incoming line list file 630 is linked by pointers to a corresponding line information file.

FIG. 6G depicts a plurality of line information files 640. In the example, line information file 641 is linked to the field for line 1 in incoming line list file 630, line information file 642 is linked to the field for line 2 in incoming line list file 630 and so on. Each line information file contains fields for data. By way of example, each of the plurality of line information files 640 includes: (1) identification of the line; (2) the conference call number to which the line is assigned, if applicable; (3) the average amplitude of the line; (4) identification of a speaker by voice print; and (4) a list of callers who are using the line. The fields for identification of a speaker by voice print and the fields for callers who are using the line are linked to corresponding participant fields in a participant list file (See FIG. 6H). In incoming line list file 630, line 1 field is linked to first line information file 641, line 2 field is linked to second line information file 642, line 3 field is linked to third line information file 643, line 4 field is linked to fourth line information file 644, line 5 is linked to fifth line information file 645 and line 6 is linked to sixth line information file 646.

FIG. 6H depicts participant list files 650 where there is one participant list file for each conference call. For example, in FIG. 6H first participant list file 651 may be for CCA 460 and second participant list file 652 may be for CCB 470.

FIG. 6I depicts participant information files 660 containing fields for each of the participants in a conference call. In the examples of FIGS. 4 and 5, there are three lines in each conference call. However, there could be more than one speaker on a line because speakers could share a line using a speaker phone. Participant list file 651 depicts four data fields for four participants where there are three lines and two of the participants are sharing a line. Each of the participants identified in the fields of the participant list file 650 is linked by pointers to a corresponding participant information file 660. For example, referring to FIG. 6I, the field for participant 1 of first participant list file 651 is linked to participant information file 661. Each of the participant list files contains data fields such as (1) name of the participant; (2) the company for which the participant works; (3) the telephone number of the participant; (3) the participant's internet address; (4) the number from which the participant is calling into the conference call; (5) the participant's voice print data; and (6) other fields as desired. Participant 2 would be linked to second participant information file 662, participant 3 would be linked to third participant information file 663 and participant 4 would be linked to fourth participant information file 664. In the same manner, if the four participants in second participant file 652 were the same they would be linked to the same participant files as described above. If the four participants were different and referred to as participants 5 through 6, then participant 5 would be linked to fifth participant file 665, participant 6 would be linked to sixth participant file 666, participant 7 would be linked to seventh participant file 667 and participant 8 would be linked to eighth participant file 668.

Figure 6J:
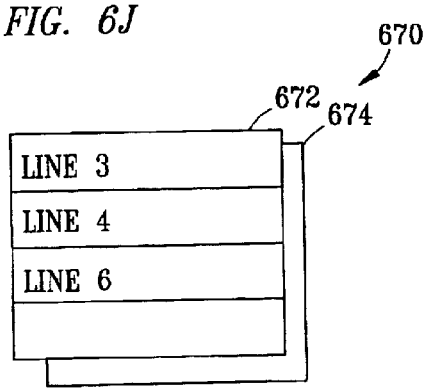
FIG. 6J a depiction of a plurality of conference call line list files.

FIG. 6J depicts conference call line lists 670. In the example, the conference call line list corresponding to CCA in FIGS. 4 and 5 is conference call line list 672 containing fields for lines 3, 4 and 6. Also in the example, conference call line list 674 corresponds to CCB and would contain fields for lines 1, 2 and 5. Each of the line fields in conference call line lists 670 are linked by pointers to the corresponding file in line information files 640.

Figure 6K:
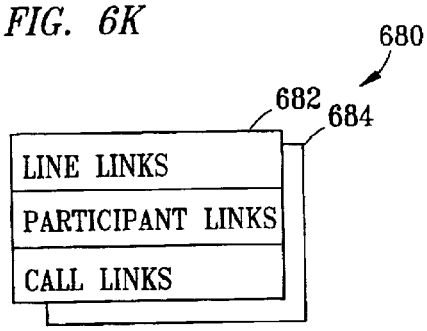
FIG. 6K is a depiction of n plurality of conference call links files.

FIG. 6K depicts links files 680 containing a links file corresponding to each conference call and containing three types of links: line links, participant links and call links. The links fields contain the pointers necessary to link the fields from one file to the corresponding fields from another file. In the example with two conference calls, CCA and CCB, first line links file 672 is for CCA and second line links file 674 is for CCB.

Figure 7:
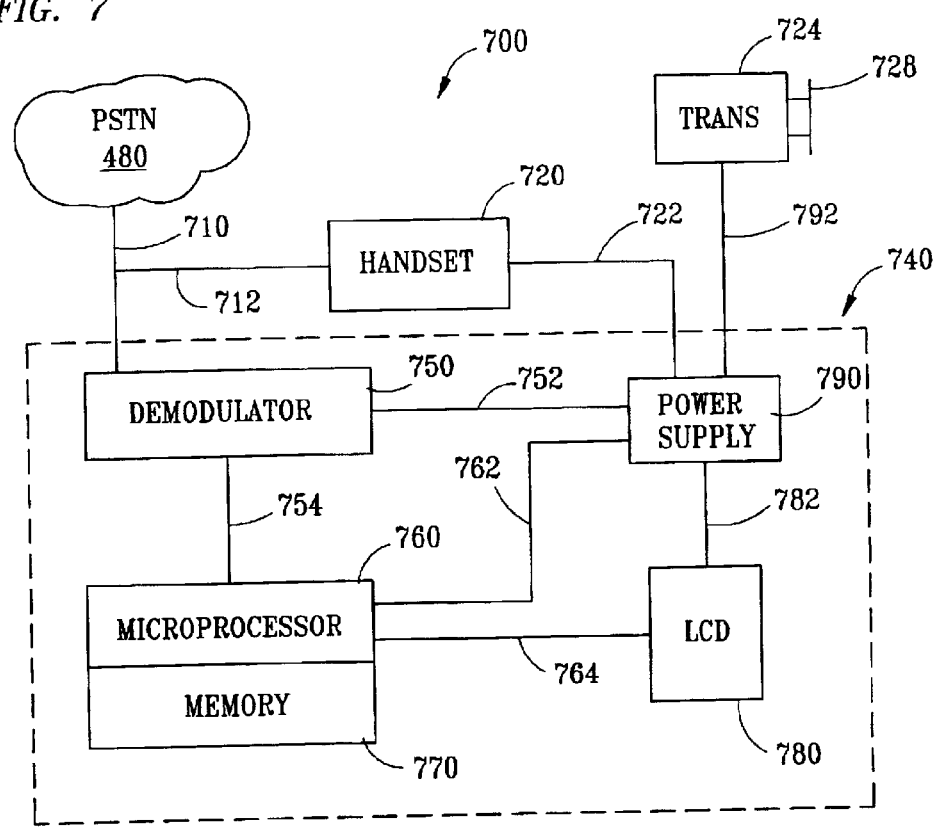
FIG. 7 is a depiction of the telephone display unit.

FIG. 7 is a depiction of telephone display unit system (TDUS) 700. TDUS 700 has PSTN 480 connected to telephone display unit (TDU) 740 by first connecting line 710. Handset 720 is connected to first connecting line 710 by second connecting line 712 and to TDU 740 by third connecting line 722.

TDU 740 has demodulator 750 connected to PSTN 480 by first connecting line 710, power supply 790 by fourth connecting line 752 and microprocessor 760 by fifth connecting line 754. Microprocessor 760 is directly connected to memory 770 and is connected to power supply 790 by sixth connecting line 762 and to liquid crystal display (LCD) 780 by seventh connecting line 764. LCD 780 is connected to power supply 790 by eighth connecting line 782. Power supply 790 is connected to transformer 724. Transformer 724 is connected to wall socket 728.

FIG. 8 depicts computer display (CD) 800. CD 800 has computer monitor, 810, monitor screen 820, and information package display 830. Information package display 830 has toolbar 832 and various items of information display including by way of example, but not limited to, the following. First data line 834 stating that the information provided is for a conference call. Second data line 836 provides a clock showing the duration of the conference call. Third data line 838 indicates that the parties to the call will be listed below. Fourth data line 866 states the total number of parties. Fifth data line 868 states the actual time of day. Sixth data line 870 displays the date. Between third data line 838 and fourth data line 866, each of the parties to the conference call are listed along with the telephone number for each party. Check boxes 890 are provided by each name so that the speaking party can be identified. For example, in FIG. 8, check 892 appearing in check box 890 indicates that, of the four conference call participants displayed, Chris Williams 860 is the party who is speaking Persons skilled in the art are aware of multiple methods of indicating the speaking party in addition to a check box. For example, the party's name can be highlighted, the party's name can be displayed in bold type, the party's name can flash on and off the screen and others may be used. In some cases, the amount of information to be displayed will exceed the available display area. For example, in a large conference call there may be more participants than can be displayed on the screen. Scroll bar 880 is provided having slider 882, up button 884 and down button 886 so that the viewer can quickly scroll up or down the participant list.

Figure 9A:
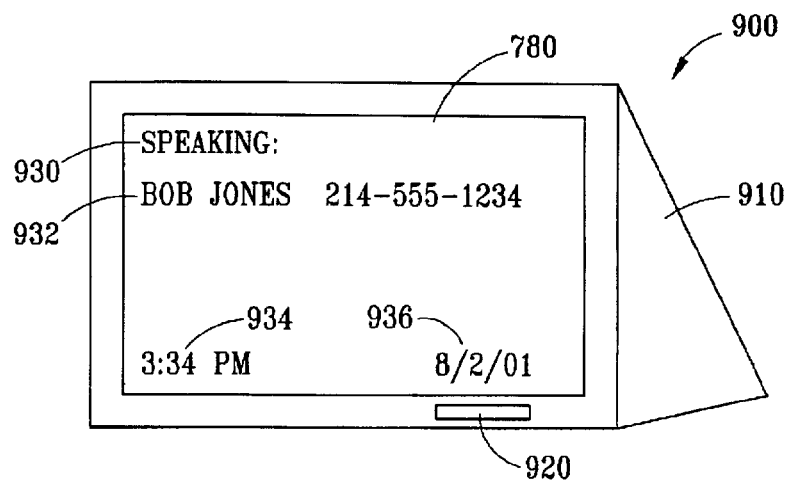
FIG. 9A is a depiction of the information shown at the telephone display unit.
Figure 9B:
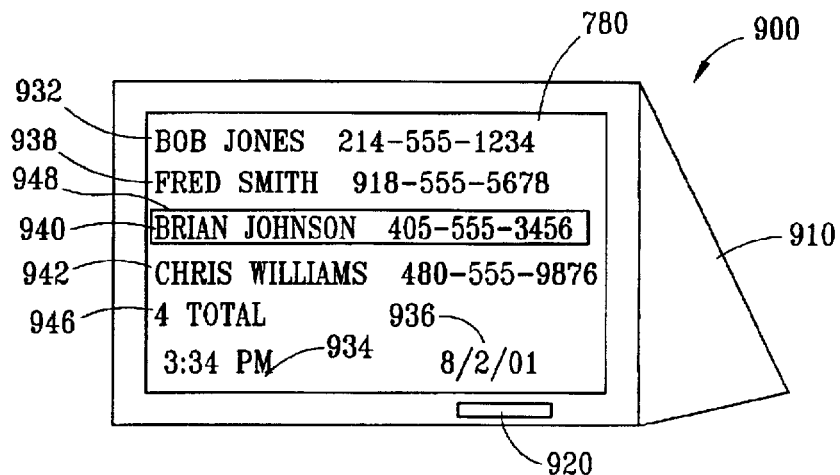
FIG. 9B is a depiction of alternate information shown at the telephone display unit.

FIG. 9A is a depiction of telephone display unit (TDU) 900 having cabinet 910 and LCD 780. In FIG. 9A LCD 780 displays the words "Speaking" 930 and the name and telephone number of the conference caller who is speaking, Bob Jones 214-555-1234 (932), the date 936 and the time 934. In FIG. 9B, LDC 780 displays all of the participants and their telephone numbers, Bob Jones 214-555-1234 (932), Fred Smith 918-555-5678 (938), Brian Johnson 405-555-3456 (940) and Chris Williams 480-555-9876 (942) and highlights the current speaker with highlight area 948 as well as providing date 936 and time of day 934. In some cases, the amount of information to be displayed will exceed the available space on LCD 780. The information displayed may be scrolled. TDU 900 using scroll button 920 built into cabinet 910.

FIG. 10 depicts roster information program (RIP) 1000. RIP 1000 begins (1002) and queries the conference caller participant for input (1004). A determination made as to whether data will be input by the operator (1006). If a determination is made that data will be input by the operator, RIP 1000 enters the data obtained by the operator (1008) and RIP 1000 goes to step 1022. If a determination is made that data will not be input by the operator, then RIP 1000 determines whether conference call numbers (CCN) have been assigned (1010). If CCNs have been assigned, the CCNs are entered (1012). If CCNs have not been assigned, then CCNs are assigned (1014). RIP 1000 displays the information (1022). A determination is made as to whether the information is complete (1024). If the information is not complete, an error message is displayed (1020) and a determination is made whether to override (1018). If a determination is made not to override, then additional information is entered (1016) and RIP 1000 goes to step 1022. If a determination is made to override, then RIP 1000 goes to step 1026 and the information is saved (1026). If at step 1024 a determination as made that the information is complete then the information is saved as roster information (RI) (1026). A determination is made as to whether another entry is to be made (1028). If another entry is to made, then RIP 1000 goes to step 1004. If another entry is not to be made, then RIP 1000 stops (1030).

FIG. 11 depicts a flow chart of telephone display unit program (TDUP) 1100. TDUP 1100 starts (1102) and receives initial roster information (RI) (1104). RI includes as a minimum, a list of all participants in the conference call. Because the TDU display is small, the participants can be identified by numbers. Therefore, the initial RI includes the participants by name and number by which they can be referred in later transmissions. Minimizing information in the RI is also important when the RI is transmitted using low frequency inaudible or barely audible tones. A determination is made as to whether there is a speaker (1106). If a determination is made that there is not a speaker, TDUP 1100 returns to step 1104. If a determination is made that there is a speaker, then the speaker's identification is displayed (1108). A determination is made as to whether a speaker has changed (1110). If a speaker has changed TDUP 1100 goes to step 1108. If a speaker has not changed, then a determination is made as to whether changes have been made to the roster (1112). If changes have not been made, TDUP 1100 goes to step 1116. If changes have been made, the changes to the roster are displayed (1114). A determination is made as to whether the call has ended (1116). If the call has not ended, then TDUP 1100 goes to step 1106. If the call has ended, then data is cleared (1118) and the TDUP 1100 ends (1120).

FIG. 12 depicts a flow chart for voice amplitude acquisition program (VAAP) 1200. VAAP begins (1202) and a determination is made as to whether there is a line with an amplitude A greater than a threshold amplitude AT (1204). AT may be zero but due to line noise and other factors, AT should be set lower than the amplitude for a speaker's voice. If no line has an amplitude greater than AT, VAAP 1200 ends (1216). If there is a line with amplitude greater than AT then the amplitude for that line is stored (1206). A determination is made as to whether there is another line with amplitude A greater than AT (1208). If there is another line with amplitude A greater than AT, then L is set equal to the next line with amplitude A greater than AT (1210) and VAAP 1200 goes to step 1206. If there is not another line with amplitude A greater than AT, then the stored amplitude samples for each line with amplitude data are averaged (1212). The average amplitude for each line with amplitude data is stored (1214) and VAAP goes to step 1204.

Figure 13:
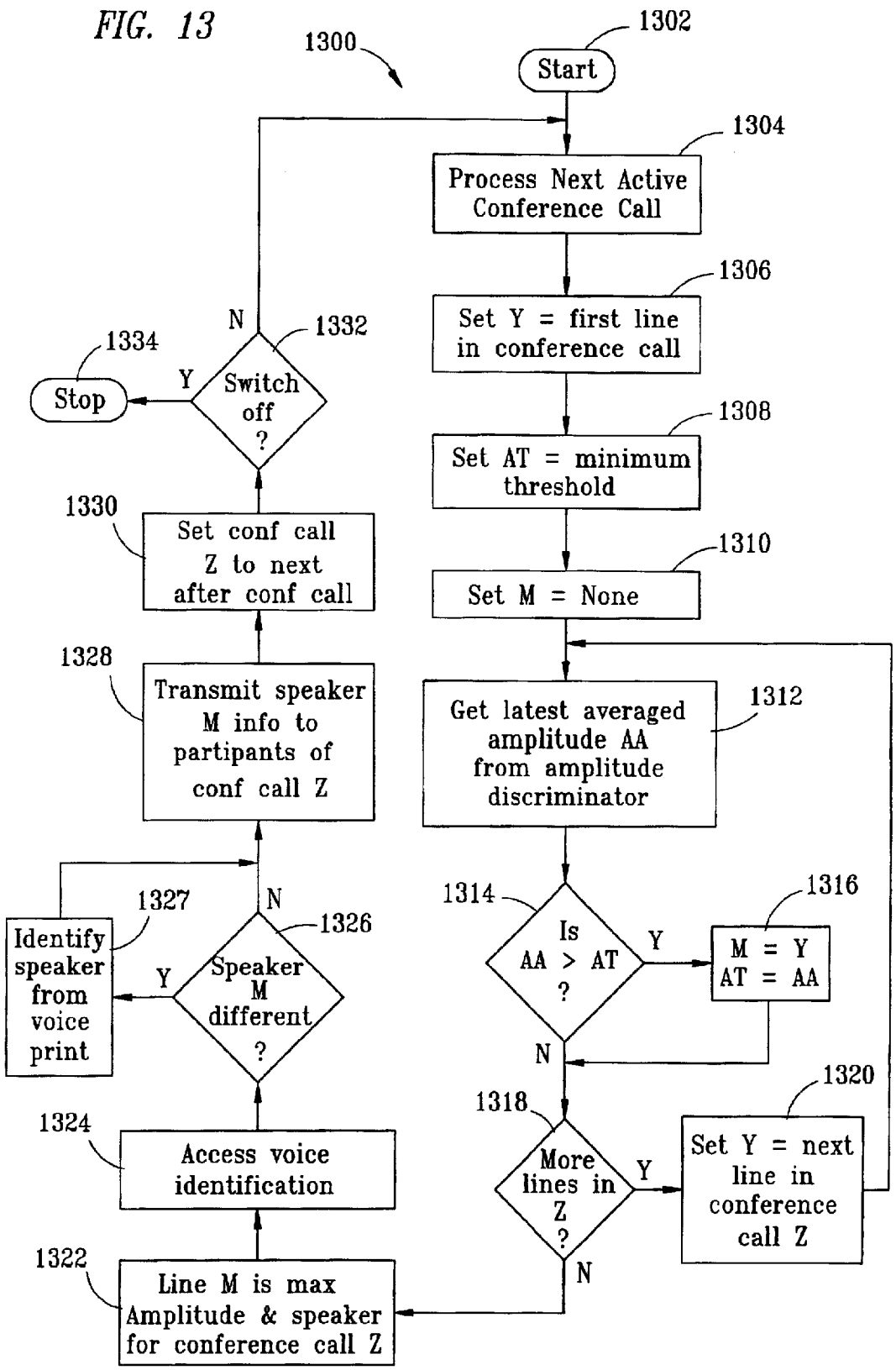
FIG. 13 is a flow chart of the voice amplitude display program.

FIG. 13 is a flow chart of voice amplitude display program (VADP) 1300. VADP 1300 begins (1302) and processes the next active conference call Z (1304). Y is set equal to the first line in the conference call (1306). AT is set equal to a value for a minimum threshold (1308). M is set equal to none (1310). VADP 1300 gets the latest average amplitude AA for line Y from the amplitude discriminator (1312). A determination is made as to whether AA is greater that AT (1314). If AA is greater than AT, then M is set equal to Y, AT is set equal to AA (1316), and VADP 1300 goes to step 1318. If AA is not equal to AT, then a determination is made as to whether there are more lines in conference call Z (1318). If there are more lines in conference call Z, then Y is set equal to the next line in conference call Z (1320) and VDAP 1300 goes to step 1312. If there are no more lines in conference call Z, then line M has the maximum amplitude and line M is the speaker's line for conference call Z (1322). If voice print capability is available, then VDAP 1300 accesses voice identification (1324). A determination is made as to whether the voice print matches the speaker for line M (1326). If the voice print matches, then speaker M is transmitted to the participants of conference call Z (1327). If the voice print does not match, then the speaker is identified from voice prints and that speaker is transmitted to participants of conference call Z (1328). Conference call Z is set to the next conference call after conference call Z (1330). A determination is made as to whether VDAP 1300 has been switched off (1332). If not, VDAP 1300 goes to step 1304. If VDAP 1300 has been switched off the program ends (1334).

Figure 14:
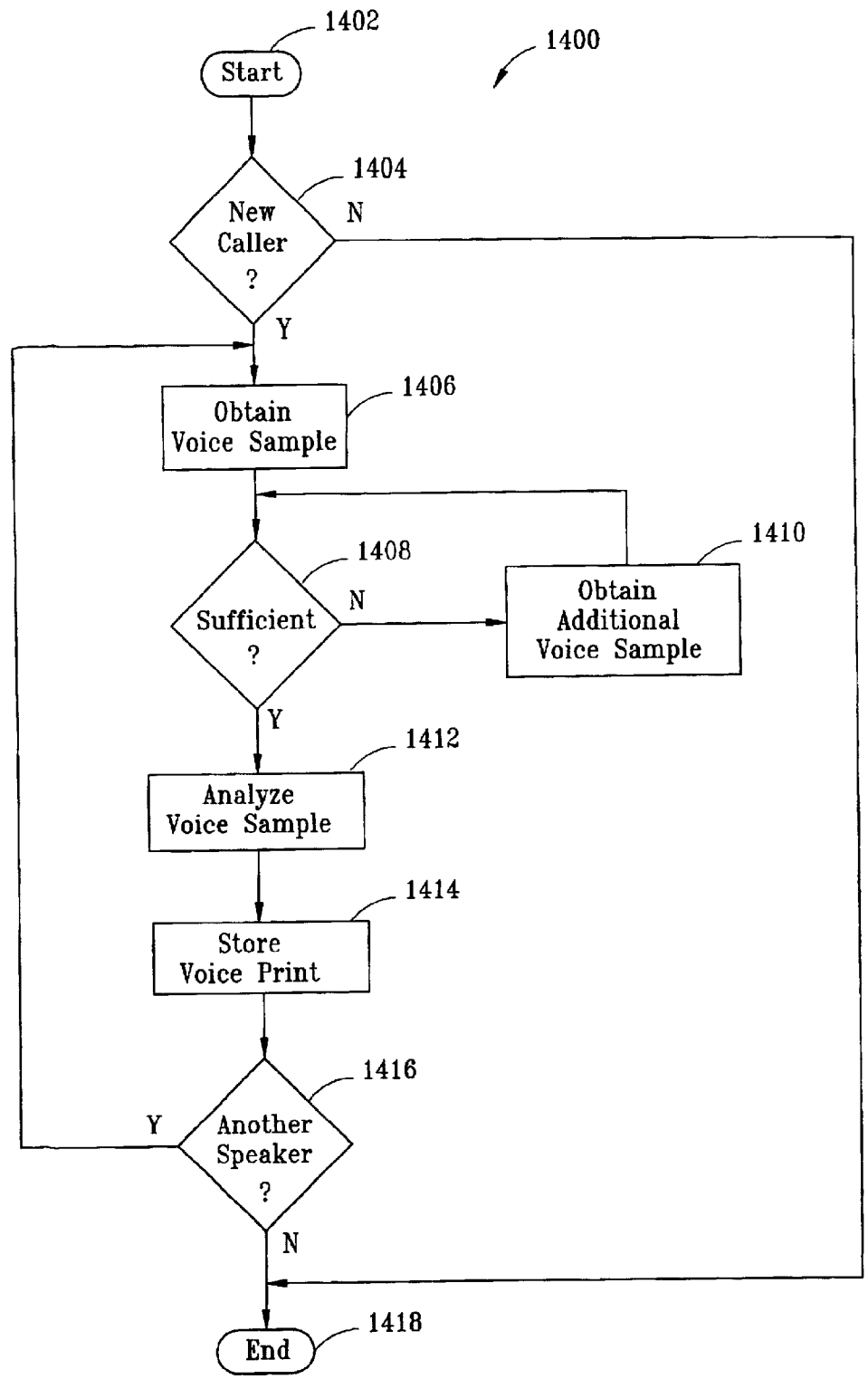
FIG. 14 is a flow chart of tho voice print acquisition program.

FIG. 14 is a flow chart of voice identification acquisition program (VIA) 1400. VIA 1400 begins (1402) and a determination is made as to whether there is a new caller (1404). If not VIA 1400 ends (1418). If there is a new caller, a voice sample is obtained (1406). A determination is made as to whether the voice sample is sufficient (1408). If not, an additional voice sample is obtained (1410) and VIA 1400 goes to step 1408. If the voice sample is sufficient, then the voice sample is analyzed (1412). Persons skilled in the art are aware of multiple way to analyze a voice sample for use in voice identification. For example, VIA 1400 may use a real-time Fourier transform on the voice sample to discern the unique overtone patterns of the speaker's vocal cavities. Alternatively, VIA 1400 may identify phonemes in the voice sample so that unique differences can be determined by observing the curvature of spectral response maxima over time. Different speakers have different curvatures (rates, inflections) in their speech which can be utilized to identify the speech. After analyzing the voice sample, a voice print is prepared and stored (1414). A determination is made as to whether there is another speaker (1416). If so, VIA 1400 goes to step 1406. If not, VIA 1400 ends (1418).

FIG. 15 is a flow chart of the voice print identification program (VPI) 1500. VPI 1500 begins, (1502). VPI determines a current voice print for each speaker (1504). A determination is made as to whether the current voice print matches a voice print in memory (1506). If there is not a match, then the current voice print is stored in memory (1508) and VPI 1500 returns to step 1504. If a match is made at step 1506, the speaker whose voice print was matched is highlighted, or otherwise designated as discussed above in FIG. 8, 9A and 9B, in the Roster Information (RI) (1510). A new RI is sent (1512). A determination is made as to whether there is new speaker (1514). If there is a new speaker, then VPRI 1500 goes to step 1504. If not, a determination is made as to whether the conference call is over (1516). If the conference call is not over, VPI 1500 goes to step 1514. If the conference call is over, then VPI 1500 ends (1518).

It will be understood from the foregoing that various modifications and changes may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed:

1. A method of providing information to a participant in a conference call in which a plurality of participants are connected by a plurality of lines and a switch, comprising:

using an amplitude acquisition program in the memory of a server computer, determining whether there is an incoming line with an amplitude greater than a threshold amplitude;

responsive to a determination that there is an incoming line with an amplitude greater than a threshold amplitude, storing the amplitude data for the incoming line; and using the server computer connected to the switch, transmitting the identity of a participant, who is currently speaking, to a participant computer connected to the server computer by a network.

2. The method of claim 1 further comprising:

using the server computer, accessing an incoming line file corresponding to a line having the greatest amplitude.

3. The method of claim 1 further comprising:

using the server computer, determining a speaker's identity by accessing a participant file linked to a line information file for the line having a greatest amplitude.

4. The method of claim 1 further comprising:

using a participant computer connected to the server computer, displaying a speaker's identity on a participant computer screen.

5. The method of claim 1 further comprising:

obtaining information by operator input.

6. The method of claim 1 further comprising:

assigning conference call identification numbers.

7. The method of claim 1 further comprising:

transmitting a roster information from the server computer to the participant computer over the network.

8. The method of claim 1 further comprising:

transmitting a speaker change from the server computer to the participant computer.

9. The method of claim 1 further comprising:

using the server computer, averaging a plurality of amplitude samples for each incoming line with an amplitude data; and storing an average amplitude for each line with an amplitude data in a field of an incoming line file.

10. The method of claim 1 further comprising:

using the participant computer, displaying a roster information on a participant computer screen.

11. The method of claim 1 further comprising:

scrolling information on a participant computer screen.

12. An apparatus for providing information to a participant in a conference call in which a plurality of participants are connected by a plurality of lines, a switch, and the Internet comprising:

a server computer;

an amplitude discriminator connected to the switch;

a first storage medium in the server computer;

a display program residing in the first-storage medium;

an amplitude acquisition program residing in the storage medium;

a plurality of participant computers connected to the server computer by the plurality of lines and by the Internet;

a switch connected to the plurality of lines and to the server computer;

wherein the program causes the server computer to:

display a roster information on the plurality of participant computers;

wherein the roster information includes a list of speaker identifications that can be accessed during the conference call by the participant computer;

wherein the amplitude acquisition program determines whether there is an incoming line with an amplitude greater than a threshold amplitude, and responsive to a determination that there is an incoming line with an amplitude greater than a threshold a amplitude, stores the amplitude data for the incoming line;

wherein the amplitude discriminator transmits the amplitude of each line connected by the switch to the server computer; and wherein the server computer determines which line has the greatest amplitude and transmits this information to the plurality participant computers so that the program causes each of the plurality of participant computers to display the identification of a participant who is currently speaking.

13. The apparatus of claim 12 wherein the storage medium further comprises a conference call list file linked by pointers to a conference call information file that contains a designation of a current speaker.

14. The apparatus of claim 12 wherein the storage medium further comprises a participant list file wherein each field containing a participant identification in the participant list file is linked by a pointer to a corresponding participant information file.

15. The apparatus of claim 12 wherein the storage medium further comprises a conference call list file.

16. The apparatus of claim 12 wherein the storage medium further comprises a conference call information file.

17. The apparatus of claim 12 wherein the storage medium further comprises an incoming line list file.

18. The apparatus of claim 12 wherein the storage medium further comprises an incoming line information file.

19. The apparatus of claim 12 wherein the program identifies the conference call participant who is speaking by determining a conference call line with the greatest amplitude.

20. The apparatus of claim 12 wherein the network is the Internet.

21. A computer readable memory for causing a server computer to transmit information over a network to a participant computer comprising:

a roster information program;

an amplitude acquisition program;

wherein the amplitude acquisition program determines whether there is an incoming line with an amplitude greater than a threshold amplitude; and responsive to a determination that there is an incoming line with an amplitude greater than a threshold amplitude, stores the amplitude for the incoming line.

22. The computer readable memory of claim 21 further comprising a voice amplitude display program.

23. The computer readable memory of claim 21 wherein the amplitude acquisition program;

averages a plurality of amplitude samples for each incoming line with an amplitude data; and stores an average amplitude for each line with an amplitude data in a field of an incoming line file.

* * * * *

UNITED STATES PATENT AND TRADEMARK OFFICE
CERTIFICATE OF CORRECTION

PATENT NO. : 6,959,074 B2
DATED : October 27, 2005
INVENTOR(S) : Berstis

It is certified that error appears in the above-identified patent and that said Letters Patent is hereby corrected as shown below:

Column 2,
Line 17, delete "sever".

Column 11,
Line 49, "storage" should be -- first storage --.

Column 12,
Line 5, delete "a" before "amplitude".
Line 13, "plurality participant" should be -- plurality of participant --.

Signed and Sealed this

Twentieth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,959,074 B2
DATED : October 25, 2005
INVENTOR(S) : Berstis

It is certified that error appears in the above-identified patent and that said Letters Patent is hereby corrected as shown below:

Column 2,
Line 17, delete "sever".

Column 11,
Line 49, "storage" should be -- first storage --.

Column 12,
Line 5, delete "a" before "amplitude".
Line 13, "plurality participant" should be -- plurality of participant --.

This certificate supersedes Certificate of Correction issued December 20, 2005.

Signed and Sealed this

Twenty-first Day of February, 2006

JON W. DUDAS
*Director of the United States Patent and Trademark Office*